United States Patent
Bandy (10) Patent No.: US 9,718,353 B2
(45) Date of Patent: Aug. 1, 2017

(54) CHASSIS FOR INDEPENDENT SUSPENSION SYSTEM

(71) Applicant: Ronald Scott Bandy, Visalia, CA (US)

(72) Inventor: Ronald Scott Bandy, Visalia, CA (US)

(*) Notice: Subject to any disclaimer, the term of this patent is extended or adjusted under 35 U.S.C. 154(b) by 77 days.

(21) Appl. No.: 14/841,913

(22) Filed: Sep. 1, 2015

(65) Prior Publication Data

US 2017/0057351 A1 Mar. 2, 2017

(51) Int. Cl.
| | | |
|---|---|---|
| *B60K 17/04* | (2006.01) | |
| *B60K 17/344* | (2006.01) | |
| *B62D 21/00* | (2006.01) | |
| *B60K 17/34* | (2006.01) | |
| *B60K 17/348* | (2006.01) | |
| *B60K 5/00* | (2006.01) | |
| *B60G 3/20* | (2006.01) | |
| *B60K 5/02* | (2006.01) | |
| *B60K 17/22* | (2006.01) | |
| *B60K 17/342* | (2006.01) | |

(52) U.S. Cl.
CPC ............ *B60K 17/358* (2013.01); *B60G 3/202* (2013.01); *B60K 5/00* (2013.01); *B60K 5/02* (2013.01); *B60K 17/22* (2013.01); *B60K 17/344* (2013.01); *B60K 17/348* (2013.01); *B62D 21/00* (2013.01); *B60G 2200/143* (2013.01); *B60G 2200/1442* (2013.01); *B60G 2300/07* (2013.01); *B60K 17/342* (2013.01); *B60K 2005/003* (2013.01)

(58) Field of Classification Search
CPC .... B60K 17/04; B60K 17/344; B60K 17/358; B62D 21/00; B62D 21/05

USPC ............... 280/789, 791, 797, 798, 799, 800; 180/238, 298, 350, 355, 356, 374, 376
See application file for complete search history.

(56) References Cited

U.S. PATENT DOCUMENTS

| | | | |
|---|---|---|---|
| 1,506,653 A * | 8/1924 | Meilike ................. | B60K 17/34 180/238 |
| 2,009,963 A | 6/1935 | Matthaei | |
| 2,173,525 A | 9/1939 | Wallace | |
| 3,420,327 A * | 1/1969 | Nallinger ............. | B60K 17/046 180/255 |

(Continued)

OTHER PUBLICATIONS

Adams, Herb, Chassis Engineering, HP Books, Penguin Group (USA) Inc. New York, NY, pp. 13-18.

*Primary Examiner* — Barry Gooden, Jr.

(57) ABSTRACT

Disclosed herein is a novel chassis design that is functionally similar to the chassis associated with the suspension system, drivetrain, and steering system disclosed in prior applications. Based on a ladder-type structure, the novel chassis includes a frame that is constructed with a low slung middle section and high arched front and rear sections. This way, the powertrain is located in the middle section at the same level as are the suspension control link frame mounting points. In contrast the chassis associated with the prior applications is planar, the powertrain being located within the frame above the suspension control link frame mounting points. Since the powertrain directly impacts the center of gravity and since the suspension control link frame mounting points are located at the lowest level of the frame in both the present invention and cited applications, then the present invention improves upon the handling characteristics of the chassis associated with the prior applications by lowering the center of gravity while preserving ground clearance.

4 Claims, 7 Drawing Sheets

(56) References Cited

U.S. PATENT DOCUMENTS

| | | | |
|---|---|---|---|
| 3,776,353 A | 12/1973 | Roth | |
| 4,140,030 A * | 2/1979 | Williams | B60K 17/3505 |
| | | | 180/233 |
| 4,147,379 A | 4/1979 | Winslow | |
| 4,386,792 A | 6/1983 | Moore et al. | |
| 4,605,084 A * | 8/1986 | Haynes | B60K 17/344 |
| | | | 180/233 |
| 4,941,680 A | 7/1990 | Baiker | |
| 5,308,115 A | 5/1994 | Ruehl et al. | |
| 5,561,902 A | 10/1996 | Jacobs et al. | |
| 6,182,784 B1 * | 2/2001 | Pestotnik | B60K 5/06 |
| | | | 180/337 |
| 6,183,013 B1 * | 2/2001 | Mackenzie | B21D 26/033 |
| | | | 280/797 |
| 6,412,818 B1 * | 7/2002 | Marando | B62D 21/02 |
| | | | 280/781 |
| 6,659,217 B2 * | 12/2003 | Smith | B60B 35/002 |
| | | | 180/348 |
| 6,702,057 B1 * | 3/2004 | Bartel | B60G 11/04 |
| | | | 180/292 |
| 6,733,040 B1 * | 5/2004 | Simboli | B62D 21/02 |
| | | | 280/784 |
| 8,002,064 B2 * | 8/2011 | Yamada | B62D 21/02 |
| | | | 180/311 |
| 8,038,379 B2 | 10/2011 | Yamashita et al. | |
| 8,177,293 B2 | 5/2012 | Boettcher | |
| 8,534,706 B2 | 9/2013 | Adams | |
| 8,657,059 B2 * | 2/2014 | Yamada | B60K 15/063 |
| | | | 180/312 |
| 8,672,355 B2 | 3/2014 | Burger et al. | |
| 8,870,206 B1 * | 10/2014 | Bandy | B60G 3/20 |
| | | | 280/124.135 |
| 9,096,110 B1 * | 8/2015 | Bandy | B62D 7/08 |
| 9,114,682 B1 * | 8/2015 | Bandy | B60G 7/02 |
| 2003/0227164 A1 * | 12/2003 | Young | B60D 21/00 |
| | | | 280/781 |
| 2006/0058148 A1 * | 3/2006 | Miyazaki | B60K 23/08 |
| | | | 475/200 |
| 2009/0058142 A1 * | 3/2009 | Park | B62D 25/20 |
| | | | 296/193.07 |
| 2009/0133952 A1 * | 5/2009 | Lindekugel | B60K 17/22 |
| | | | 180/339 |
| 2010/0224431 A1 * | 9/2010 | Cimatti | B60K 17/04 |
| | | | 180/245 |
| 2011/0259657 A1 * | 10/2011 | Fuechtner | B60K 6/52 |
| | | | 180/65.21 |
| 2013/0093154 A1 * | 4/2013 | Cordier | B60G 3/20 |
| | | | 280/124.109 |
| 2013/0127146 A1 * | 5/2013 | Ohno | B60K 15/063 |
| | | | 280/781 |
| 2013/0157803 A1 * | 6/2013 | Takaishi | F16H 13/02 |
| | | | 476/72 |
| 2014/0062049 A1 * | 3/2014 | Bandy | B60G 9/022 |
| | | | 280/124.116 |
| 2014/0262586 A1 * | 9/2014 | Dada | B62D 7/18 |
| | | | 180/252 |
| 2015/0159751 A1 * | 6/2015 | Pritchard | B60K 17/3467 |
| | | | 475/150 |
| 2015/0183318 A1 * | 7/2015 | Bandy | B60K 5/1216 |
| | | | 180/233 |

* cited by examiner

CHASSIS FOR INDEPENDENT SUSPENSION SYSTEM

CROSS-REFERENCE TO RELATED APPLICATIONS

This application represents a novel chassis whose frame is specifically designed to operate in conjunction with the suspension system, drivetrain, and steering system covered in U.S. patent application Ser. Nos. 14/059,062, 14/087,552, and 14/246,108, respectively.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Disclosed in patent application Ser. No. 14/059,062 is a type of double A-arm suspension configuration derived from Ford's Twin I-Beam front suspension system. This suspension system cooperates with the drivetrain disclosed in patent application Ser. No. 14/087,552 and the steering system disclosed in patent application Ser. No. 14/246,108. These three cooperative functions are installed on a frame, and thereby represent a chassis for a four wheel drive (4WD) vehicle. The frame possesses a ladder-type structure that lies in a single horizontal plane whereby the powertrain is positioned between the frame sides while the frame mounting points for the suspension control links are positioned below the frame sides.

In general, a vehicle's handling characteristics improve as the center of gravity height is decreased. Given that a significant portion of a vehicle's weight is due to the powertrain which in turn affects the center of gravity, then a vehicle's handling characteristics can be improved by decreasing the resting height of the powertrain. Predictably therefore, the handling of a vehicle constructed with the chassis represented by the cited applications can be improved by decreasing the resting height of the powertrain. Resting height refers to the distance that the powertrain resides above the ground.

Decreasing the resting height of the powertrain can be easily achieved by lowering the vehicle closer to the ground; e.g., by reducing the length or spring rate of the suspension springs, a technique widely adopted by sports cars. However such a technique also acts to decrease the ground clearance of the vehicle, an act contrary to the predominant characteristic of any off-road vehicle such as a 4WD vehicle.

Since the chassis represented by the cited applications is directed towards a 4WD vehicle, then a 4WD vehicle constructed with this chassis would acquire improved handling without compromising off-road capability if the resting height of the powertrain was decreased without sacrificing ground clearance. Accordingly, the present invention addresses this issue by offering a chassis design whose powertrain sits lower in the frame without sacrificing ground clearance than does the powertrain in the chassis represented in the cited applications.

BRIEF SUMMARY OF THE INVENTION

The present invention addresses a chassis design derived from the frame associated with the suspension system, drivetrain, and steering system covered in U.S. patent application Ser. Nos. 14/059,062, 14/087,552, and 14/246,108, respectively.

The present invention also addresses a chassis design that:
employs a ladder-type frame with a low slung middle section and high arched front and rear sections whereby the powertrain resides at the same level as the middle section, reverse power couplers are incorporated into the frame sides of the front and rear sections, and front and rear differential housings are located in the front and rear sections above the reverse power couplers, respectively, the front section is narrower than is the rear section;

utilizes a suspension link configuration different from the one disclosed in U.S. patent application Ser. No. 14/059,062. The frame mounting points for the trailing links in the present invention are located on frame cross-members while those in the cited application are located on the frame sides. The result is the diagonal geometry of the trailing links in the present invention is greater than that in the cited application, the geometry cooperates with the narrower front section of the frame to offer a greater turning radius. Both the spring and damping processes are furnished by the segmented air shock absorber, this shock absorber being covered in U.S. patent application Ser. No. 13/854,055;

utilizes a drivetrain different from the one disclosed in U.S. patent application Ser. No. 14/087,552. The present invention employs the offset power coupler to introduce flexibility in the location of the powertrain and drivetrain within the frame. Herein, the powertrain and drivetrain occupy different levels whereby the powertrain rests below the drivetrain; whereas in the cited application, the powertrain and drivetrain occupy the same level; a level referring to a horizontal plane;

utilizes a steering system different from the one disclosed in U.S. patent application Ser. No. 14/246,108. In the present invention, a specialized steering box with a long output shaft transmits steering input directly from the firewall to the tie rods while the cited application employs a bell-crank as an intermediary between an ordinary steering box and tie rods;

improves upon the handling characteristics of the chassis associated with the cited applications by lowering the center of gravity while preserving off-road capability; a quality achieved by effectively lowering the powertrain in the frame without changing ground clearance, the lowering effect resulting from the present invention using a frame that locates the powertrain at the same level as the frame mounting brackets for the suspension links compared to the cited applications using a frame that locates the powertrain above the frame mounting brackets for the suspension links.

BRIEF DESCRIPTION OF THE SEVERAL VIEWS OF THE DRAWING

BRIEF DESCRIPTION OF THE DRAWINGS

Regarding the drawings, a chassis/frame for a 4WD vehicle is illustrated in detail. In a given drawing, certain parts are either not shown due to graphical limitations of the view or are not labeled in order to emphasize other parts. FIG. 6 shows the front of the chassis whereby the cross beam of the frame is selectively transparent in order to reveal the steering box on the driver side and parts of the drivetrain on the passenger side. It is appreciated that these drawings depict only illustrated embodiments of the invention and are therefore not limited to the precise arrangements and instrumentalities shown;

DETAILED DESCRIPTION OF THE INVENTION

The chassis disclosed in this application refers to a frame that interactively operates with variants of the suspension system, drivetrain, and steering system covered in U.S. patent application Ser. Nos. 14/059,062, 14/087,552, and 14/246,108, respectively. The suspension system, drivetrain, and steering system disclosed in the cited applications serve only as the basis for the present invention. The frame in the present invention is significantly different than that in the cited applications. Since the frame serves to locate the suspension system, drivetrain, and steering system, each system or drivetrain being located in order to function in cooperation with the others, then differences between the suspension system, drivetrain, and steering system in the present invention and that in the cited applications are expected. These differences are emphasized as they tend to offer improvements on the features noted in the cited applications.

Figure 1:
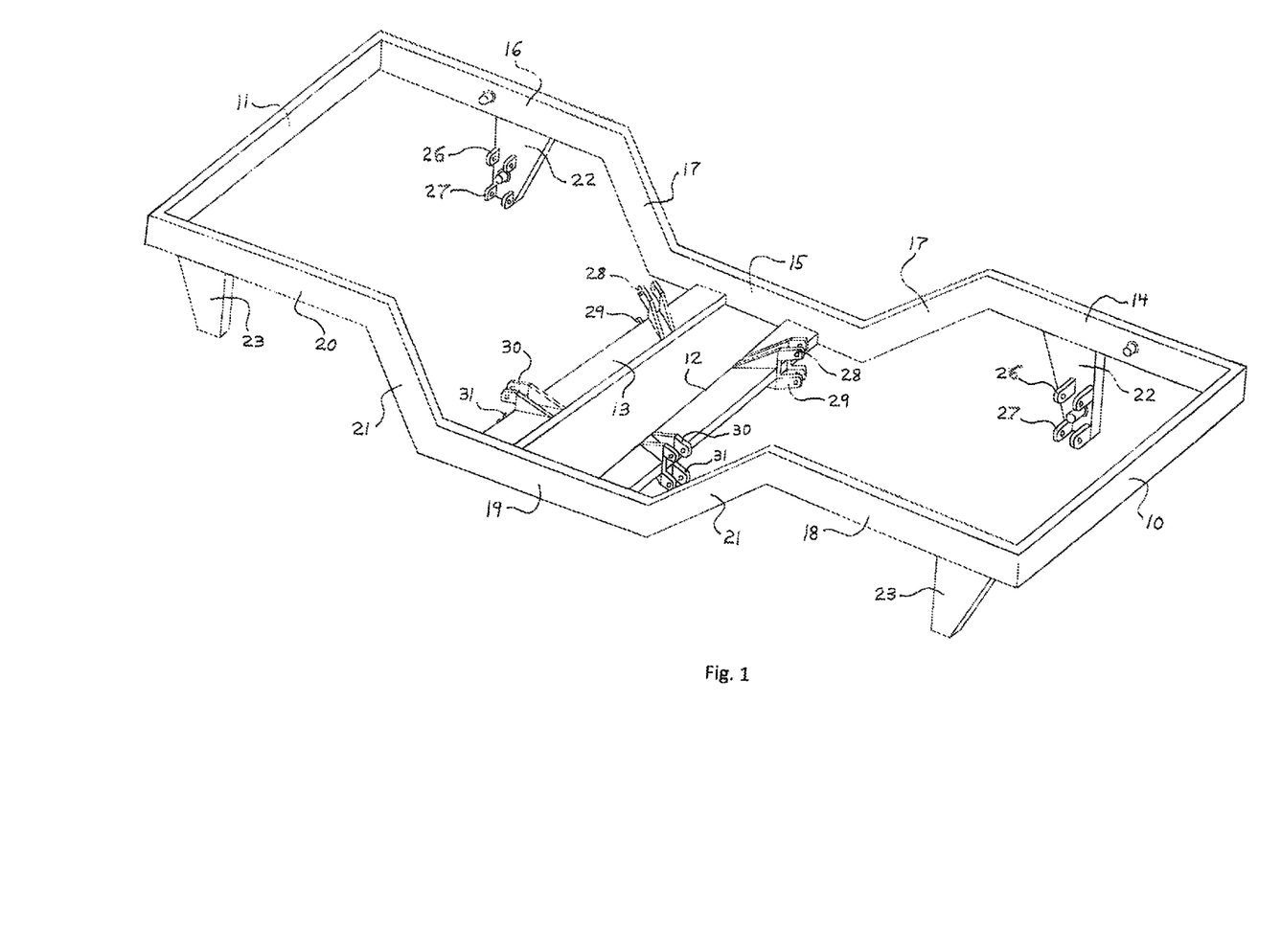
FIG. 1 is a side perspective view of the frame with suspension control link frame mounting brackets for a 4WD vehicle.

Referring to FIG. 1, the frame with the mounting brackets for the suspension control links is illustrated. In particular, the structure and shape of the frame in the present invention is different from that disclosed in the three patent application Ser. Nos. 14/059,062, 14/087,552, and 14/246,108. Wherein the cited applications use a frame with a planar structure and hour-glass shape, the present invention uses one with a bi-planar structure and bottle shape:

The structure of the frame is based on a ladder-type design with the front end narrower than the back end. The structure includes thr driver and passenger frame sides, front and rear cross-beams 10 and 11, transmission cross-member 12, and transfer case cross-member 13. The driver and passenger frame sides are positioned side-by-side in a manner such that each frame side is aligned with and equally spaced from the longitudinal line, the longitudinal line passing through the center of the vehicle from front to back. The driver and passenger frame sides are connected to one another at the front and rear ends by the front and rear cross-beams 10 and 11 and at the middle by the transmission and transfer case cross-members 12 and 13, respectively.

The driver and passenger frame sides each consist of five parts—a front part 14 and 18, middle part 15 and 19, rear part 16 and 20, and one and the other angled parts 17 and 21—the combination of the front, middle, rear, and two angled parts from the driver and passenger frame sides defines the front, middle, rear, and one and the second angled sections of the frame.

The front and rear sections occupy one horizontal plane while the middle section occupies a second horizontal plane whereby the plane occupied by the front and rear sections is above that occupied by the middle section. The front and rear sections are located at the front and rear ends of the frame while the middle section is located in the middle of the frame and refers to the section of the frame that is closest to the ground. One and the other angled sections serve to connect the front and rear sections to the middle section, respectively. The one angled section extends downward and outward from the front section to the middle section while the second angled section extends downward only from the rear section to the middle section. This way, the parts of the driver and passenger frame sides in the front section are closer to the longitudinal line than are those in the rear and middle sections, the front section being narrower to enable a smaller turning radius.

Figure 2:
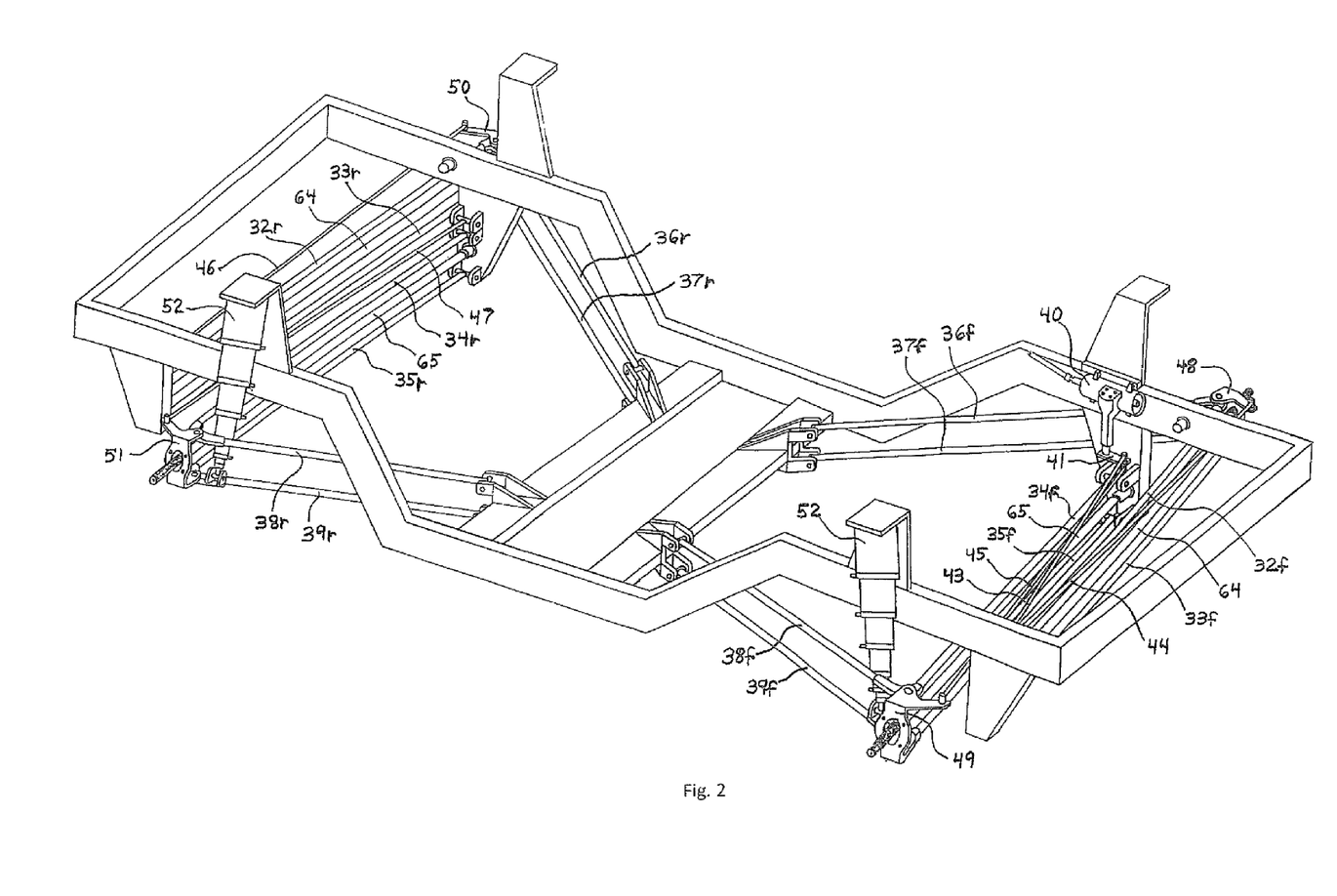
FIG. 2 is a side perspective view of the frame with suspension and steering systems for a 4WD vehicle, FIG. 3 a top plan view thereof.
Figure 3:
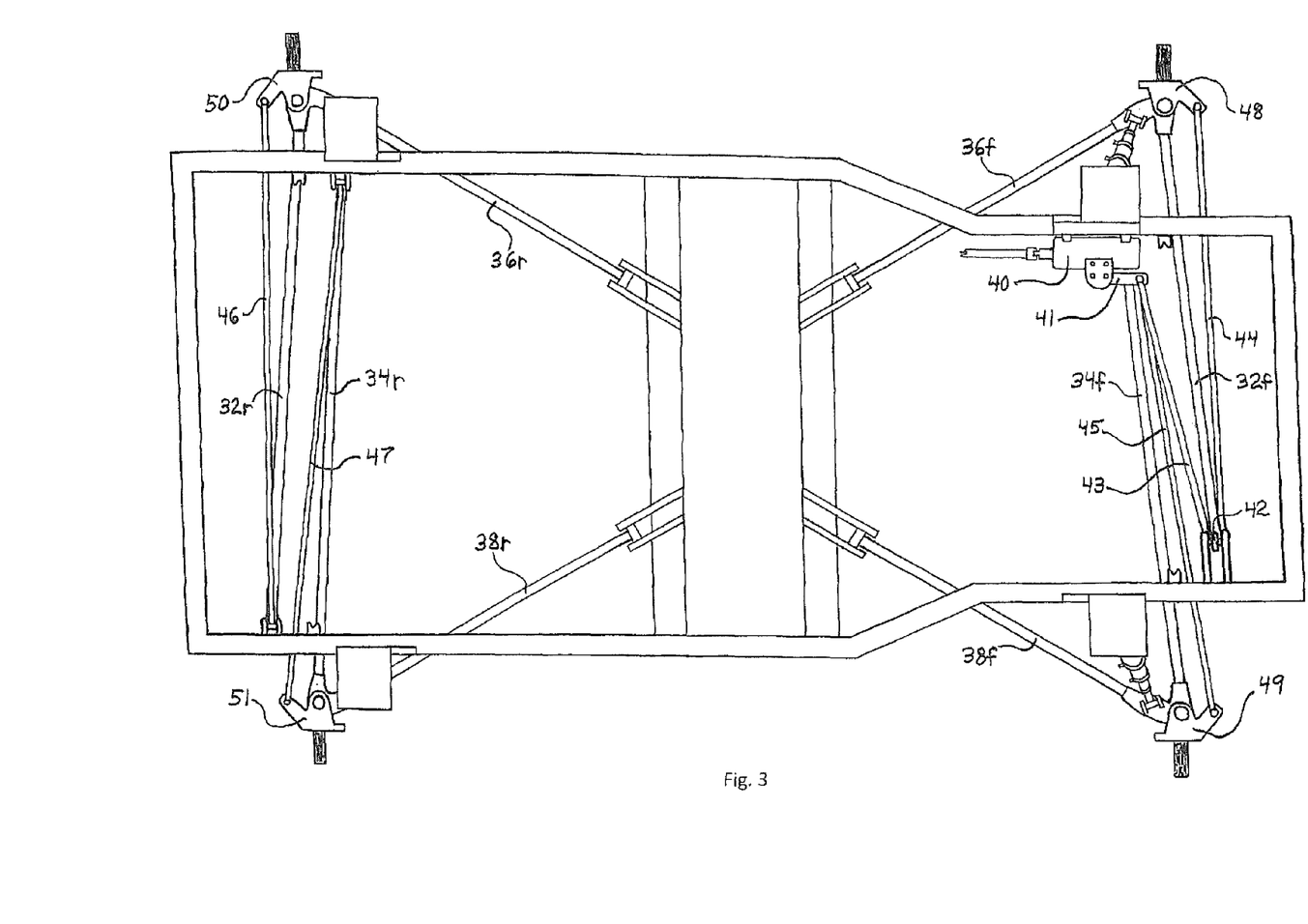

Referring to FIG. 1, the frame with the mounting brackets for the suspension control links is illustrated, and to FIGS. 2 and 3, the frame with the suspension and steering systems is illustrated, emphasizing in this case particularly the configuration of the suspension system. While the suspension configuration in the present invention is the same as that disclosed in patent application Ser. No. 14/059,062, the locations of the frame mounting brackets for and resulting geometry of the trailing links are different:

The front driver or passenger upper and lower leading links 32*f* and 33*f* or 34*f* and 35*f* extend laterally from the front passenger or driver reverse power coupler 23 or 22 to the front driver or passenger knuckle 48 or 49, the front passenger or driver reverse power coupler 23 or 22 being proximate the front passenger or driver wheel (not shown), respectively; while the rear driver or passenger upper and lower leading links 32*r* and 33*r* or 34*r* and 35*r* extend laterally from the rear passenger or driver reverse power coupler 23 or 22 to the driver or passenger non-steering knuckle 50 or 51, the rear passenger or driver reverse power coupler 23 or 22 being proximate the rear passenger or driver wheel (not shown), respectively.

Figure 6:
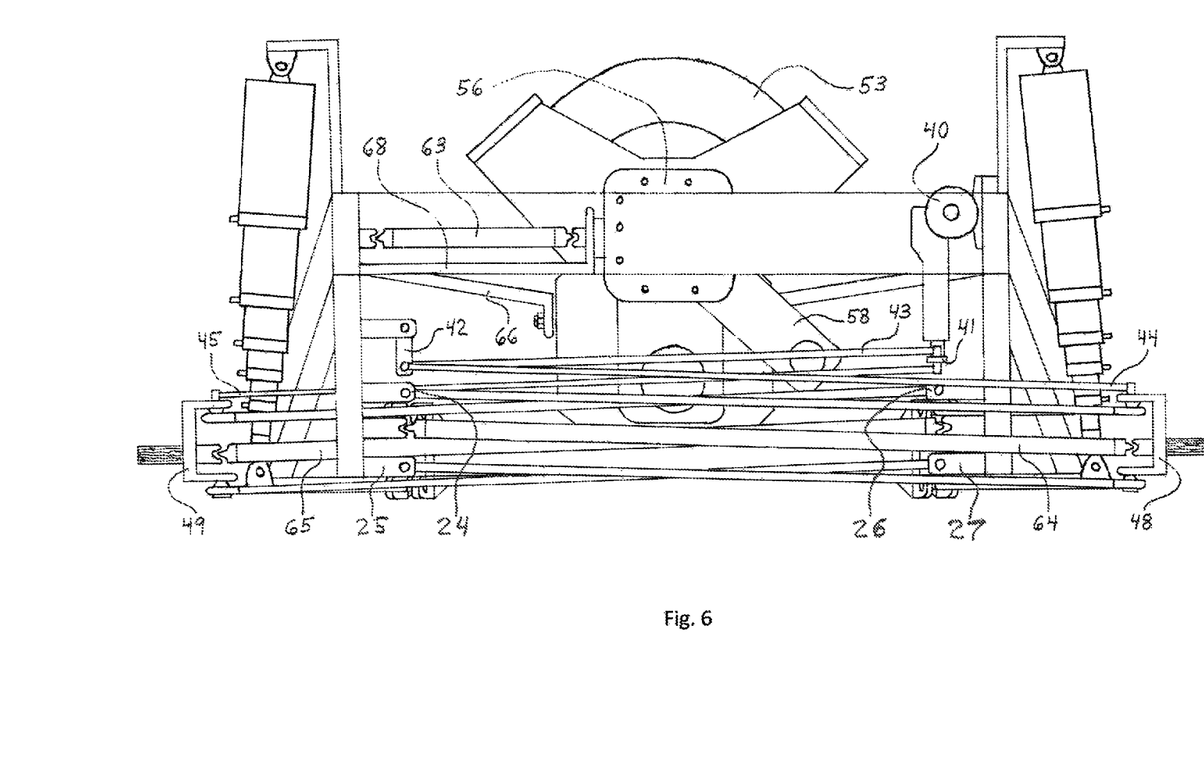
FIG. 6 is a front view of the front end of the chassis at ride height thereof.

The first ends of the front or rear driver and passenger upper leading links 32*f* or 32*r* and 34*f* or 34*r* are affixed to flexible joints, the flexible joints are pivotally attached to mounting brackets 24 and 26, and the mounting brackets 24 and 26 are affixed to the middle of the front or rear passenger and driver reverse power couplers 23 and 22 above the output shafts; while, the first ends of the front or rear driver and passenger lower leading links 33*f* or 33*r* and 35*f* or 35*r* are affixed to flexible joints, the flexible joints are pivotally attached to mounting brackets 25 and 27, and the mounting brackets 25 and 27 are affixed to the bottoms of the front or rear passenger and driver reverse power couplers 23 and 22 below the output shafts, respectively. Also each shaft and mounting bracket 24, 25, 26, or 27 protrude inward towards the longitudinal line. The driver or passenger reverse power coupler 22 or 23 is incorporated into both the driver or passenger frame side front and rear parts 14 and 16 or 18 and 20, thereby the front and rear sections of the frame each include the driver and passenger reverse power couplers 22 and 23, respectively. The incorporation is implemented in a manner such that the middle and bottom of the driver or passenger reverse power coupler 22 or 23 are located substantially at the same levels as the top and bottom of the middle section thereby locating the mounting brackets 24 and 25 or 26 and 27 substantially at the same levels as the top and bottom of the middle section, respectively. The result is that the mounting brackets 24 and 25 or 26 and 27 are effectively located at the same level as the middle section (mounting brackets 24 and 25 are shown in FIG. 6). A level refers to a horizontal plane, the plane being parallel to the longitudinal line.

The front driver or passenger upper and lower trailing links 36f and 37f or 38f and 39f extend outwardly from the transmission cross-member 12 to the front driver or passenger knuckle 48 or 49 while the rear driver or passenger upper and lower trailing links 36r and 37r or 38r and 39r extend outwardly from the transfer case cross-member 13 to the rear driver or passenger non-steering knuckle 50 or 51, respectively.

The first ends of the front driver or passenger upper and lower trailing links 36f and 37f or 38f and 39f are affixed to flexible joints, the flexible joints are pivotally attached to mounting brackets 28 and 29 or 30 and 31, and the mounting brackets 28 and 29 or 30 and 31 are vertically affixed above and on the transmission cross-member 12, respectively. The first ends of the rear driver or passenger upper and lower trailing links 36r and 37r or 38r and 39r are affixed to flexible joints, the flexible joints are pivotally attached to mounting brackets 28 and 29 or 30 and 31, and the mounting brackets 28 and 29 or 30 and 31 are vertically affixed above and on the transfer case cross-member 13, respectively. Also each mounting bracket 28, 29, 30, or 31 projects outward away from the longitudinal line. The mounting brackets 28 and 29 or 30 and 31 are attached to (1) the transmission cross-member 12 in a manner such that the mounting brackets 28 and 29 or 30 and 31 are located substantially at the same levels as the top and bottom of the middle section or (2) the transfer case cross-member 13 in a manner such that the mounting brackets 28 and 29 or 30 and 31 are located substantially at the same levels as the top and bottom of the middle section. The result is that the mounting brackets 28 and 29 or 30 and 31 are effectively located at the same level as the middle section. A level refers to a horizontal plane, the plane being parallel to the longitudinal line.

The second ends of the front driver or passenger upper leading and trailing links 32f and 36f or 34f and 38f are attached to the upper apex bracket while the second ends of the front driver or passenger lower leading and trailing links 33f and 37f or 35f and 39f are attached to the lower apex bracket, respectively. The upper and lower apex brackets each contain a ball joint, and the ball joints are pivotally attached either to the top and bottom of the driver or passenger steering knuckle 48 or 49, respectively.

The second ends of the rear driver or passenger upper leading and trailing links 32r and 36r or 34r and 38r are attached to the upper apex bracket while the second ends of the rear driver or passenger lower leading and trailing links 33r and 37r or 35r and 39r are attached to the lower apex bracket, respectively. The upper and lower apex brackets each contain a ball joint, and the ball joints are pivotally attached either to the top and bottom of the driver or passenger non-steering knuckle 50 or 51, respectively.

Note: having the front and rear sections positioned above the middle section permits the use of longer reverse power couplers 22 and 23 without changing ground clearance compared to that in the cited application, thereby effectively increasing the vertical distance between the frame sides and mounting bracket 24, 25, 26, or 27 without changing ground clearance. This feature allows the suspension to have the same compression travel as that in the cited application without the need for apertures in the frame sides.

Figure 4:
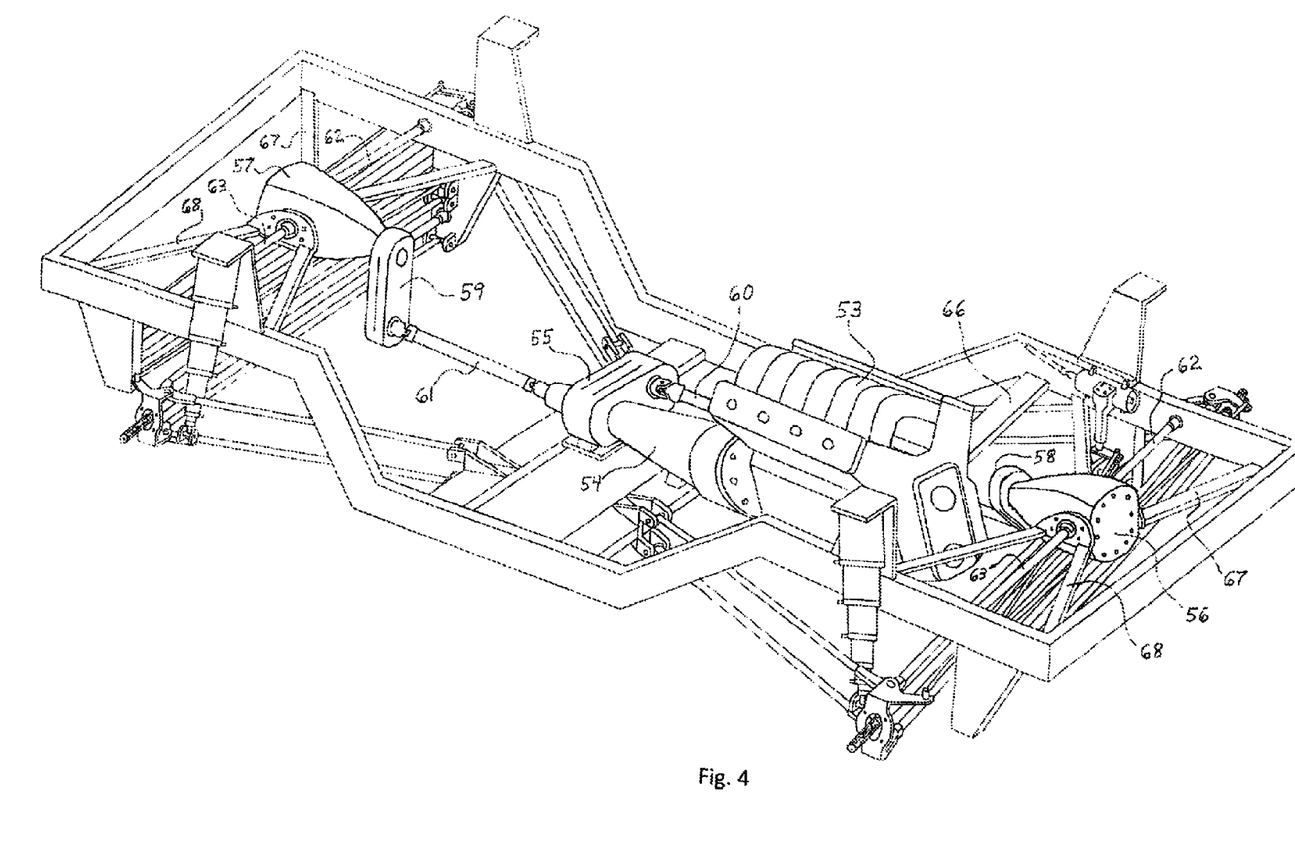
FIG. 4 is a side perspective view of the chassis for a 4WD vehicle.
Figure 5:
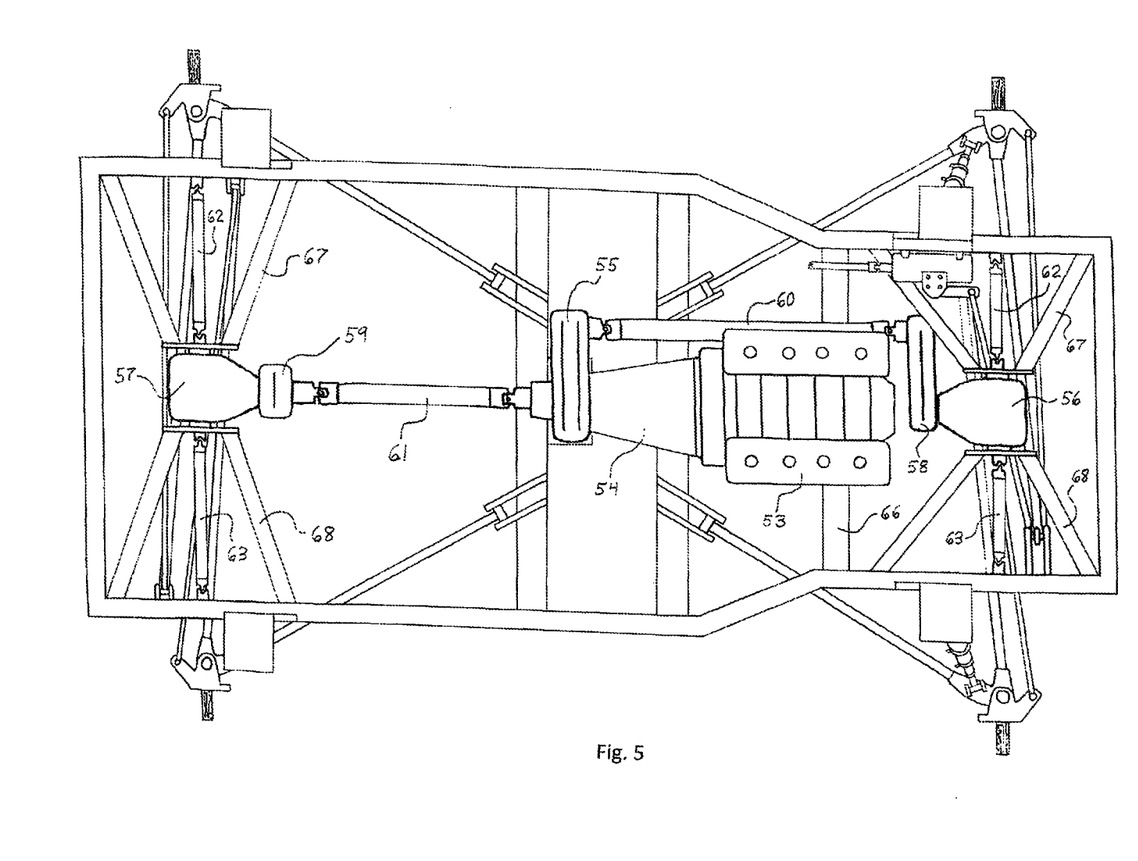
FIG. 5 a top plan view thereof.
Figure 7:
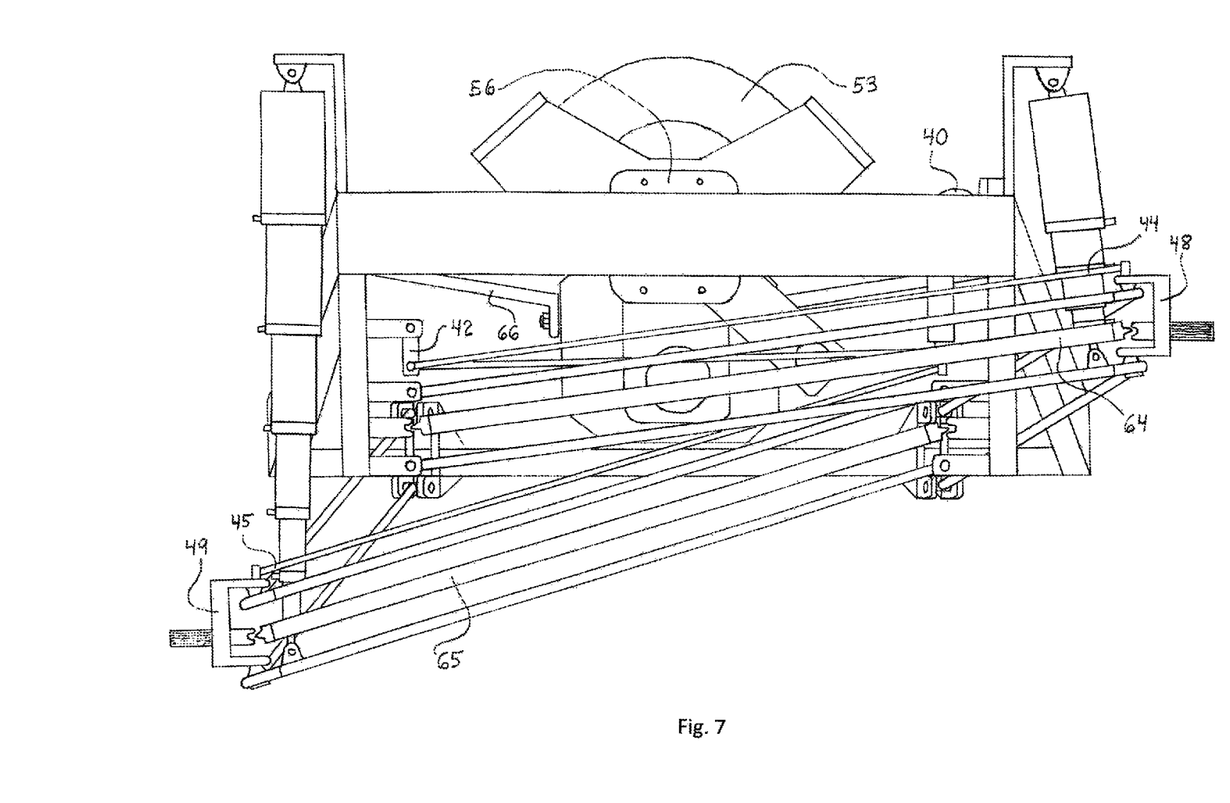
FIG. 7 is a front view of the front end of the chassis articulated thereof.

Referring to FIGS. 4 and 5, the chassis is illustrated and to FIGS. 6 and 7, the front of the chassis is illustrated, emphasizing in this case particularly the drivetrain. While the drivetrain described herein operates similarly to that disclosed in patent application Ser. No. 14/087,552, the configuration of and components used in each drivetrain are different:

The engine 53, transmission 54, and transfer case 55 are located in the front, middle, and middle sections all at the same level as the middle section, being secured to the frame with the engine mounting brackets 66, and transmission and transfer case cross-members 12 and 13, respectively. Meanwhile, the front and rear differential housings 56 and 57 are located in the front and rear sections at the same level as the front and rear sections, each being secured to the frame with driver and passenger differential housing mounting brackets 67 and 68, respectively. Since the middle section is positioned below the front and rear sections, then the engine 53, transmission 54, and transfer case 55 are positioned below the front and rear differential housings 56 and 57 resulting in a misalignment between the first and second output shafts of the transfer case 55 and the pinion shafts of the front and rear differential housings 56 and 57, respectively. Front and rear offset power couplers 58 and 59 are used to restore this alignment: first, the front or rear offset power coupler 58 or 59 is directly connected to the front or rear differential housing 56 or 57 such that the output shaft of the front or rear offset power coupler 58 or 59 is adapted to the pinion shaft of the front or rear differential housing 56 or 57, respectively; and second, the front offset power coupler 58 extends downward and towards the driver side of the engine 53 such that the input shaft of the front offset power coupler 58 is aligned with the first output shaft of the transfer case 55 while the rear offset power coupler 59 extends straight downward such that the input shaft of the rear offset power coupler 59 is aligned with the second output shaft of the transfer case 55, the rear offset power coupler 59 being absent in the cited application. The alignments refer (1) to the input shaft of the front offset power coupler 58 occupying the same line occupied by the first output shaft of the transfer case 55, the line being positioned between the engine 53 and middle section of the driver frame side, the line being parallel to the longitudinal line and (2) to the input shaft of the rear offset power coupler 59 occupying the same line occupied by the second output shaft of the transfer case 55, the line being the longitudinal line. The alignments minimize the angles adopted by the flexible joints on the front and rear drive shafts 60 and 61, thereby ensuring that power is transmitted smoothly, efficiently, and free of vibration from the transfer case 55 to the front and rear offset power couplers 58 and 59, respectively.

Power is transmitted from the engine 11 to the transmission 12 then from the transmission 12 to the transfer case 13 in a manner typical in the art. The front drive shaft 60 has a front and rear ends, each end is affixed to a flexible joint whereby the flexible joint on the front end is attached to the input shaft of the front offset power coupler 58 and that on the rear end is attached to the first output shaft of the transfer case 55; the attachments enable power to be transmitted from the transfer case 55 to the front offset power coupler 58. Likewise, the rear drive shaft 61 has a front and rear ends, each end is affixed to a flexible joint whereby the flexible joint on the front end is attached to the second output shaft of the transfer case 55 and that on the rear end is attached to the input shaft of the rear offset power coupler 59; the attachments enable power to be transmitted from the transfer case 55 to the rear offset power coupler 59.

Power is able to be transmitted from the front and rear offset power couplers 58 and 59 to the front and rear differential housings 56 and 57 due to the output shafts of the front and rear offset power couplers 58 and 59 being adapted to the pinion shafts of the front and rear differential housings 56 and 57, respectively.

The first ends of the front driver and passenger short axle shafts 62 and 63 are pivotally attached to the flexible joint flanges on the driver and passenger sides of the front differential housing 56 and the second ends of the front driver and passenger short axle shafts 62 and 63 are pivotally attached to the input shafts of the front driver and passenger reverse power couplers 22 and 23 thereby enabling power to be transmitted from the front differential housing 56 to the front driver and passenger reverse power couplers 22 and 23; while the first ends of the front driver and passenger long axle shafts 64 and 65 are pivotally attached to the output shafts of the front passenger and driver reverse power couplers 23 and 22 and the second ends of the front driver and passenger long axle shafts 64 and 65 are pivotally attached to the front driver and passenger wheel hubs (not shown) thereby enabling power to be transmitted from the front passenger and driver reverse power couplers 23 and 22 to the front driver and passenger wheel hubs, respectively. The front driver or passenger wheel hub has a first and second sides such that the first side is rotatably attached to the driver or passenger steering knuckle 48 and 49 and the second side is attached to the front driver or passenger wheel, respectively.

The first ends of the rear driver and passenger short axle shafts 62 and 63 are pivotally attached to the flexible joint flanges on the driver and passenger sides of the rear differential housing 57 and the second ends of the rear driver and passenger short axle shafts 62 and 63 are pivotally attached to the input shafts of the rear driver and passenger reverse power couplers 22 and 23 thereby enabling power to be transmitted from the rear differential housing 57 to the rear driver and passenger reverse power couplers 22 and 23; while the first ends of the rear driver and passenger long axle shafts 64 and 65 are pivotally attached to the output shafts of the rear passenger and driver reverse power couplers 23 and 22 and the second ends of the front driver and passenger long axle shafts 64 and 65 are pivotally attached to the rear driver and passenger wheel hubs (not shown) thereby enabling power to be transmitted from the rear passenger and driver reverse power couplers 23 and 22 to the rear driver and passenger wheel hubs, respectively. The rear driver or passenger wheel hub has a first and second sides such that the first side is rotatably attached to the driver or passenger non-steering knuckle 50 and 51 and the second side is attached to the rear driver or passenger wheel, respectively.

Note: By extending the front offset power coupler 58 downward as well as towards the driver frame side and by using a rear offset power coupler 59, components in the powertrain can be more easily aligned with those in the drivetrain thereby increasing the flexibility and convenience of installing the powertrain and drivetrain within the frame compared to the alignment between the powertrain and drivetrain in the cited application. The alignments resulting from the offset power couplers allow the use of a bi-planar fame, the key factor in relocating the powertrain closer to the ground without sacrificing ground clearance.

Referring to FIGS. 2 and 3, the frame with the suspension and steering systems is illustrated and to FIGS. 6 and 7, the front of the chassis is illustrated, emphasizing in this case particularly the configuration of the steering system. While the steering system described herein operates in the same manner as that disclosed in patent application Ser. No. 14/246,108, the configuration of and components used in each steering system are different:

A steering box 40 with a long sector shaft is attached to the inner part of the front driver frame side such that the sector shaft projects downward towards the ground and lies alongside the front driver reverse power coupler 22 thereby locating the pitman arm 41 immediately above the front passenger upper leading link frame mounting bracket 26. This way the pitman arm 41 can be pivotally attached directly to the front passenger tie rod 45 and connector link 43, thereby obviating the need for a bellcrank and simplifying the configuration of the steering system. In the cited application, a draglink pivotally attaches the pitman arm 41 to the horizontal arm of the bellcrank while the vertical arm of the bellcrank is pivotally attached to the front passenger tie rod 45 and connector link 43.

Steering input originates at the steering wheel (not shown) and passes through the firewall (not shown) to the steering shaft via a steering column (not shown) in a manner common in the art. The steering shaft is pivotally attached to the input shaft of the steering box 40, thereby transmitting steering input from the steering shaft to the steering box 40. The sector shaft of the steering box 40 is attached to the pitman arm 41. The pitman arm 41 is pivotally attached to the first ends of the front passenger tie rod 45 and connector link 43 while the second ends of the front passenger tie rod 45 and connector link 43 are pivotally attached to the passenger steering knuckle 49 and swingset arm 42, thereby enabling steering input to be transmitted directly from the steering box 40 to the passenger steering knuckle 49 and swingset arm 42, respectively. The swingset arm 42 is pivotally attached to the first end of the front driver tie rod 44 while the second end of the front driver tie rod 44 is pivotally attached to the driver steering knuckle 48, thereby enabling steering input to be transmitted from the swingset arm 42 to the driver steering knuckle 48.

The first ends of the rear driver and passenger tie rods 46 and 47 are pivotally attached to mounting brackets while the mounting brackets are attached to the rear passenger and driver reverse power couplers 23 and 22 above the rear driver and passenger upper leading link frame mounting brackets 24 and 26, respectively; the second ends of the rear driver and passenger tie rods 46 and 47 are pivotally attached to the driver and passenger non-steering knuckles 50 and 51, respectively. The rear driver and passenger tie rods 46 and 47 travel up and down in concert with the rear driver and passenger upper and lower leading links 32 and 33, and 34 and 35 without any lateral movement, the lack of lateral movement preventing the driver and passenger non-steering knuckles 50 and 51, respectively, from turning thereby locking them into a straight-ahead orientation.

While the invention has been illustrated and described as embodied in a vehicle chassis, it is not intended to be limited to the details shown, since it will be understood that various omissions, modifications, substitutions and changes in the forms and details of the device illustrated and in its operation can be made by those skilled in the art without departing in any way from the scope and spirit of the present invention.

What is claimed is:

1. A chassis for a vehicle having front and rear independent suspension systems, a drivetrain, and a steering system, the chassis comprising:

a frame with driver and passenger frame sides, the frame and each of the frame sides having a front end, middle, and rear end;

wherein the front and rear independent suspension systems each possess driver upper and lower leading links, passenger upper and lower leading links, driver upper and lower trailing links, and passenger upper and lower trailing links, each of the links being pivotally attached to respective mounting brackets;

wherein the drivetrain cooperates with a powertrain and includes front driver and passenger reverse power couplers and rear driver and passenger reverse power couplers, front and rear offset power couplers, and front and rear differential housings; wherein each of the couplers has an input shaft and an output shaft;

wherein the steering system includes a steering box, connector link, and front passenger tie rod; wherein the steering box has a long sector shaft, the sector shaft being attached to a pitman arm;

wherein the frame has a structure, the structure includes the driver and passenger frame sides, front and rear cross-beams, a transmission cross-member, and a transfer case cross-member, the driver and passenger frame sides are positioned side-by-side in a manner such that each of the frame sides is aligned with and equally spaced from a longitudinal line, the longitudinal line passing through a center of the frame from the front end to the rear end; wherein the driver and passenger frame sides are connected to one another at the front and rear ends with the cross-beams and at the middle with the transmission and transfer case cross-members; wherein each of the frame sides consists of five parts—a front, middle, rear, and two angled parts, the two angled parts defining one and a second angled parts; wherein the front, middle, rear, and two angled parts of the combined driver and passenger frame sides define a front, middle, rear, and two angled sections of the frame, respectively; wherein the front and rear sections occupy one horizontal plane while the middle section occupies a second horizontal plane such that the horizontal plane occupied by the front and rear sections is above that occupied by the middle section; wherein the front and rear sections are located at the front and rear ends of the frame while the middle section is located at the middle of the frame and refers to the section of the frame that is closest to a ground; wherein one and the second angled sections serve to connect the front and rear sections to the middle section, respectively; wherein the one angled section extends downward and outward from the front section to the middle section while the second angled section extends downward only from the rear section to the middle section, the extensions resulting in parts of the driver and passenger frame sides in the front section being closer to the longitudinal line than are those in the rear and middle sections.

2. The chassis of claim 1, wherein the front or rear driver and passenger reverse power couplers are incorporated into the front or rear parts of the driver and passenger frame sides, respectively, thereby the front or rear section of the frame includes the driver and passenger reverse power couplers; wherein the incorporation is implemented in a manner such that a middle and bottom of the driver or passenger reverse power coupler are located substantially at same levels as a top and bottom of the middle section of the frame, each of the levels defines a horizontal plane, the horizontal planes being parallel to the longitudinal line;

wherein the passenger or driver upper leading link mounting bracket is affixed to the middle of the driver or passenger reverse power coupler above the output shaft while the passenger or driver lower leading link mounting bracket is affixed to the bottom of the driver or passenger reverse power coupler below the output shaft, the affixments locating the passenger or driver upper and lower leading link mounting brackets substantially at the same levels as the top and bottom of the middle section of the frame, respectively;

wherein the driver or passenger upper and lower trailing link mounting brackets are either (1) affixed above and on the transmission cross-member in a manner such that the mounting brackets are located substantially at the same levels as the top and bottom of the middle section of the frame or (2) affixed above and on the transfer case cross-member in a manner such that the mounting brackets are located substantially at the same levels as the top and bottom of the middle section of the frame, respectively.

3. The chassis of claim 1, wherein the powertrain includes an engine, transmission, and transfer case, the transfer case has first and second output shafts; wherein the engine, transmission, and transfer case are located in the front and middle sections of the frame at the same level as the middle section, being secured to the frame with engine mounting brackets and the transmission and transfer case cross-members while the front and rear differential housings are located in the front and rear sections of the frame at a same level as the front and rear sections, each being secured to the frame with differential housing mounting brackets, respectively, the locations serve to position the engine, transmission, and transfer case below the front and rear differential housings;

wherein the front and rear offset power couplers are directly connected to the front and rear differential housings, respectively, the direct connections effected in a manner such that: the front offset power coupler extends downward and towards the driver side of the engine so that the input shaft of the front offset power coupler is aligned with the first output shaft of the transfer case, the alignment referring to the input shaft of the front offset power coupler occupying a same line occupied by the first output shaft of the transfer case, the line passing between the engine and the middle section of the driver frame side parallel to the longitudinal line; while the rear offset power coupler extends straight downward so that the input shaft of the rear offset power coupler is aligned with the second output shaft of the transfer case, the alignment referring to the input shaft of the rear offset power coupler occupying a same line occupied by the second output shaft of the transfer case, the line referring to the longitudinal line.

4. The chassis of claim 1, wherein the steering box is attached to an inner part of the front driver frame side such that the sector shaft extends downward towards the ground and lies alongside the front driver reverse power coupler thereby locating the pitman arm directly above the mounting bracket for the front passenger upper leading link, the location permitting the pitman arm to be pivotally attached to the front passenger tie rod and connector link; wherein the inner part of the front driver frame side faces the longitudinal line.

* * * * *